United States Patent [19]

Uchida

[11] Patent Number: 5,574,716
[45] Date of Patent: Nov. 12, 1996

[54] OPTICAL DISC PROTECTIVE STORAGE DEVICE

[75] Inventor: Hiromichi Uchida, Tokyo, Japan

[73] Assignee: Toyo Chemical Co., Ltd., Tokyo, Japan

[21] Appl. No.: 389,231

[22] Filed: Feb. 15, 1995

[51] Int. Cl.$^6$ .............................. G11B 3/70; G11B 5/86; G11B 7/26; G11B 25/30; B65D 25/39
[52] U.S. Cl. .......................................... 369/291; 206/308.1
[58] Field of Search ........................... 369/291; 206/311, 206/312, 308.1, 308.3, 387.1, 387.15, 444, 561, 308.16; 211/40, 41

[56] References Cited

U.S. PATENT DOCUMENTS

| | | | |
|---|---|---|---|
| 1,371,464 | 3/1921 | Bennett | 369/291 |
| 4,771,890 | 9/1988 | Hofland et al. | 206/308.1 |
| 4,815,600 | 3/1989 | Niles et al. | 206/561 |
| 4,893,295 | 1/1990 | Matsuura et al. | 369/265 |
| 4,997,089 | 3/1991 | Ozeki | 206/311 |
| 5,121,278 | 6/1992 | Tanaka et al. | 369/291 |
| 5,462,160 | 10/1995 | Youngs | 206/308.1 |

*Primary Examiner*—Stuart S. Levy
*Assistant Examiner*—Adriana Giordana
*Attorney, Agent, or Firm*—Wenderoth, Lind & Ponack

[57] ABSTRACT

An optical disc accommodation or storage device permitting storage of an optical disc in a readily visible, neat and stable state, while also permitting the insertion and removal of the optical disc quickly and smoothly without causing damage to a record portion of the disc or the accommodation device.

The device comprises a sheet 2 having an optical disc accommodation recess member 5. The optical disc accommodation recess member 5 is formed with stopper walls 11a for contacting a portion of the outer periphery of an optical disc 3 accommodated in the optical disc accommodation recess member 5. Therefore, the disc 3 is prevented from being detached from the optical disc accommodation recess member 5. The outer edge of the optical disc accommodation member is provided with optical disc retaining pieces 6 to 8 projecting toward the center of the optical disc accommodation recess member 5 for clamping the optical disc 3 in cooperation with the bottom surface of the recess member 5.

7 Claims, 7 Drawing Sheets

F I G . 5
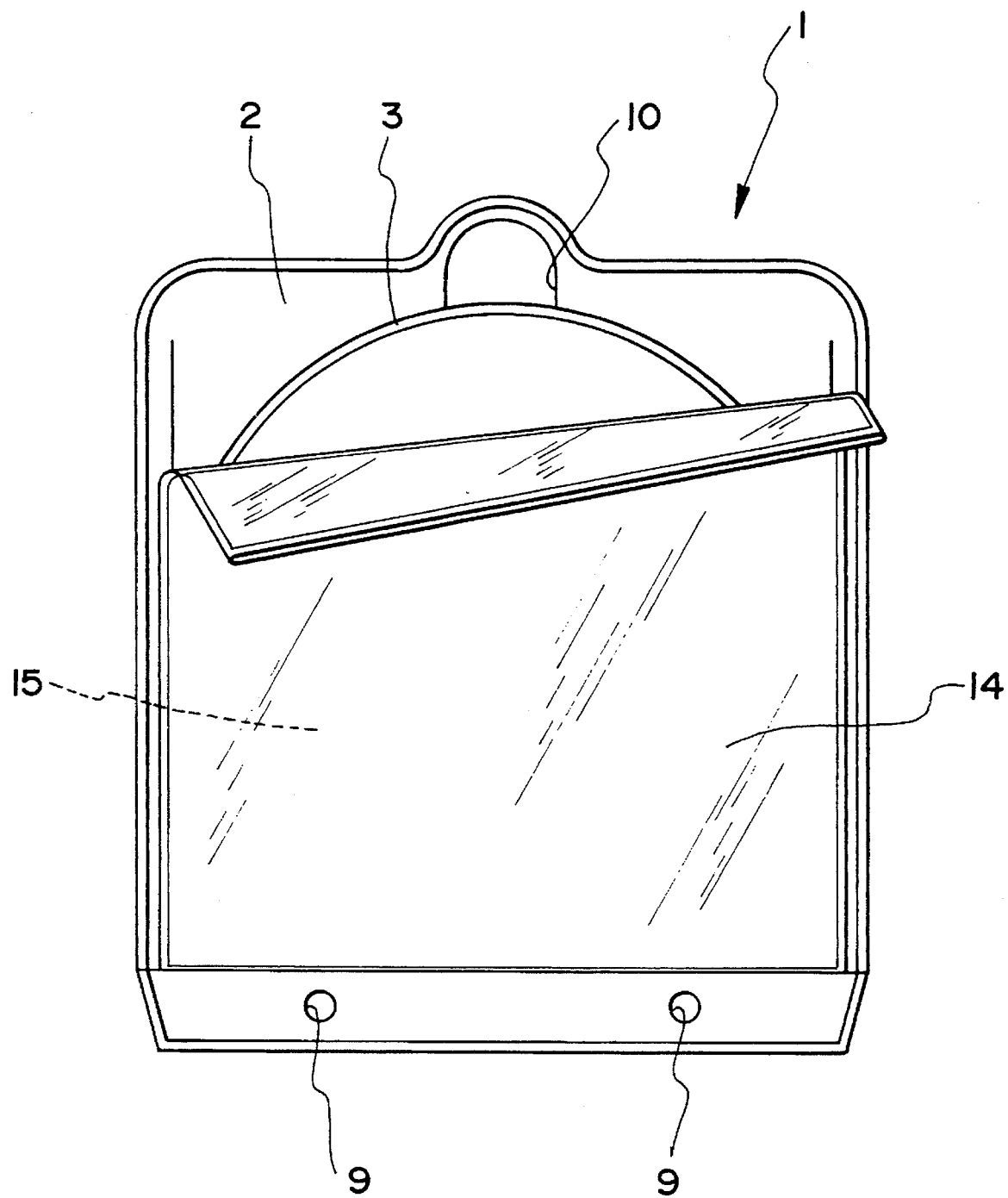

OPTICAL DISC PROTECTIVE STORAGE DEVICE

BACKGROUND OF THE INVENTION

1. Field of the Invention

This invention relates to optical disc accommodation devices for storing optical discs such as musical compact discs (CD) and computer compact discs (CD-ROM). More particularly, the invention concerns an optical disc accommodation device, which does not only permit arrangement and storage of optical discs in a readily visible, neat and stable state but also is free from the possibility of damage to the recording portion of the optical disc that might otherwise be caused when accessing or removing the disc from a stored state. The accommodation device also permits the disc to be taken out quickly and smoothly.

2. Prior Art

FIG. 7 shows a prior art optical disc accommodation device, which comprises a synthetic resin sheet 22 formed with optical disc accommodation recesses 23 each for accommodating an optical disc 24 therein and soft synthetic resin sheets 25 bonded to the synthetic resin sheet 22 along the periphery of the optical disc accommodation recess 23 to cover substantially the lower half of the optical disc 24 accommodated in the recess 23. Each soft synthetic resin sheet 25 thus forms an optical disc accommodation bag 26 together with the associated recess 23.

In this prior art optical disc accommodation device 21, each optical disc accommodation recess 23 has an elongate groove 27 extending from a portion corresponding to the center hole 24a of the accommodated optical disc 24 to an upper end portion of the recess in the direction of removing the accommodated optical disc 24. The groove 27 permits the optical disc 24 to be moved by holding the disc 24 with fingers applied to the upper end and center hole 24a of the disc 24 without touching the optical disc accommodation recess 23.

Each optical disc accommodation recess 23 is provided, at each side of the optical disc 24, with an inclined portion 28 having a stopper wall 28a for preventing inadvertent detachment of the optical disc 24 from the recess.

When inserting an optical disc 24 into one of the optical disc accommodation recesses 23 having the above construction, the optical disc 24 is held with fingers applied to the outer periphery and center hole 24a without touching the record portion thereof, and then the disc is inserted into the optical disc accommodation bag 26 through the opening 26a by moving a finger applied to the disc along the groove 27 while the disc is held slightly tilted with the leading end directed downward.

To retrieve the optical disc 24 from the optical disc accommodation device 21, the optical disc 24, which overlays the groove 27, is held with fingers applied to an upper edge and the center hole 24a, then the leading edge, in the removal direction, is raised slightly to clear the stopper walls 28a, and then a finger applied to the center hole is moved along the groove 27. In this way, it can be smoothly removed.

The above prior art optical disc accommodation device permits neat arrangement and accommodation of optical discs in a stable state. It also permits an optical disc to be accommodated and taken out without the possibility of the important record portion of the disc being touched by a finger and contaminated. However, with this optical disc accommodation device the soft synthetic resin sheet 25, which constitutes the optical disc accommodation bag 26, is subject to flexing and consequently obstructing the opening 26a which is a very narrow gap, thus preventing smooth insertion of the optical disc. When taking an optical disc in or out of the accommodation section with the narrow opening partially obstructed, an excessive force is liable to be applied to the optical disc. This may cause damage to the soft synthetic resin sheet 25 and the record portion of the optical disc may contact the sheet 25 causing damage to the record portion of the optical disc.

SUMMARY OF THE INVENTION

The invention seeks to solve the above problems, and it is an object of the invention to provide an optical disc accommodation or storage device, which avoids contact of the device with a record portion of an optical disc to prevent damage to the device or contamination of the disc. The inventive device is constructed to ensure accommodation of the disc in a stable state without the possibility of detachment. The device also allows quick and smooth insertion and removal of the disc without the possibility of damage to the disc caused by excessive forces applied thereto.

BRIEF DESCRIPTION OF THE DRAWINGS

FIG. 5 is a plan view showing a third embodiment of the optical disc accommodation device according to the invention;

DETAILED DESCRIPTION OF THE PREFERRED EMBODIMENT

Figure 1:
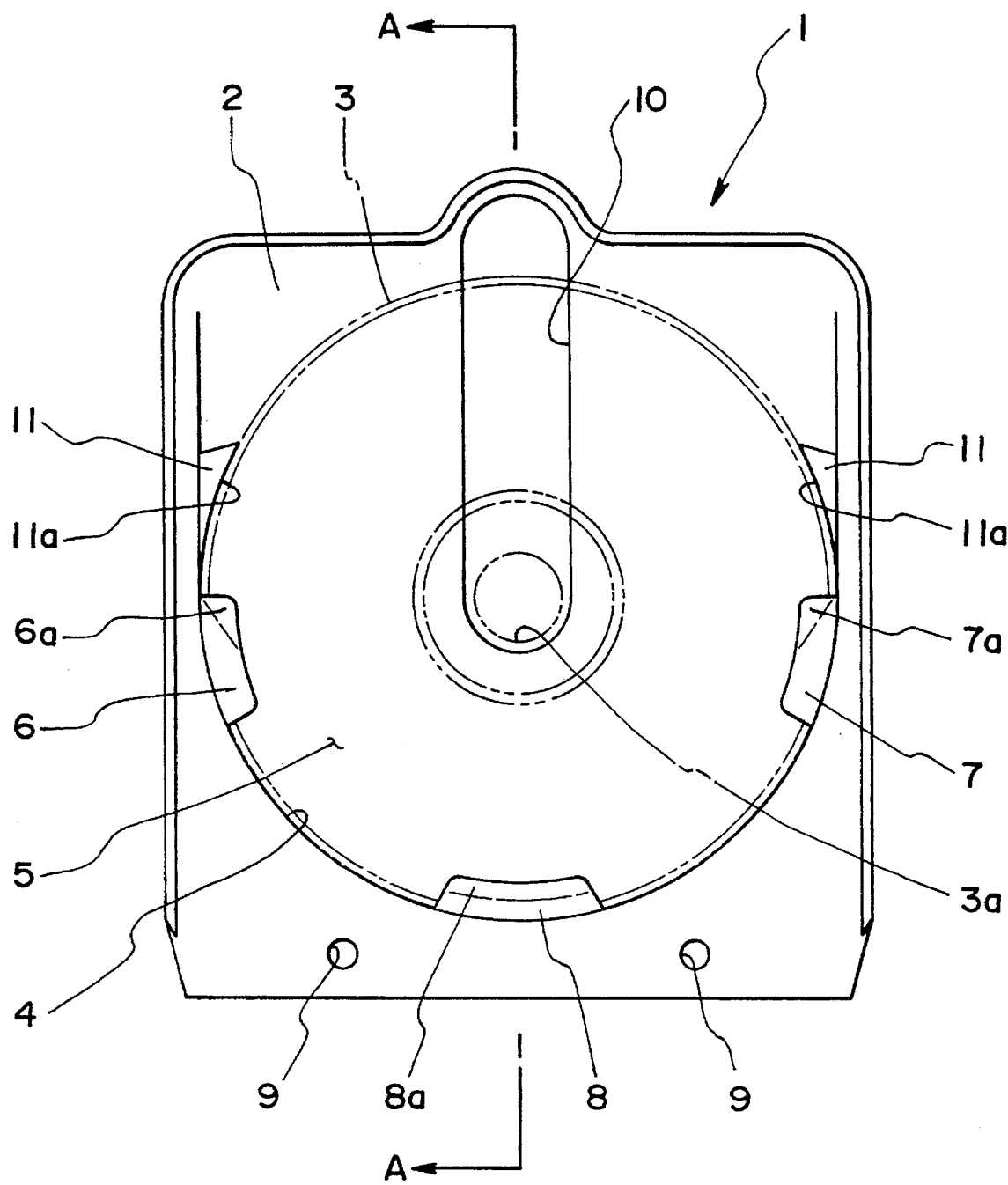
FIG. 1 is a plan view showing a first embodiment of the optical disc accommodation device according to the invention.
Figure 2:
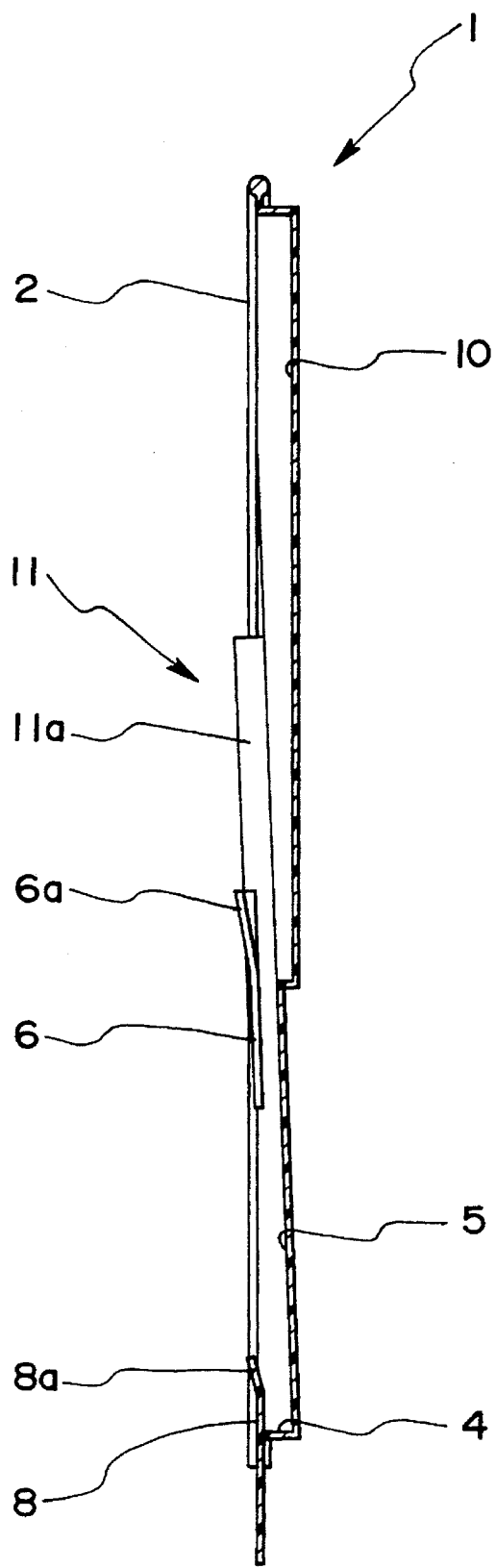
FIG. 2 is an enlarged-scale sectional view taken along line A—A in FIG. 1.

FIGS. 1 and 2 show a first embodiment of the optical disc accommodation device according to the invention. The illustrated optical disc accommodation device 1 according to the invention comprises a synthetic resin sheet or planar member 2, on which an optical disc accommodation recess member 5 is formed by an inner peripheral upstanding wall 4 in contact with over a half circumference of the outer periphery of an accommodated optical disc 3. In the optical disc accommodation recess member 5, at three positions thereof, i.e. at a left and a right position slightly below the vertical center and at a lower end, optical disc retaining pieces 6 and 8 project inward from the inner peripheral wall 4. The sheet 2 has its lower portion formed with filing holes 9 for inserting a binder ring therethrough so that a plurality of optical disc accommodation devices 1 can be filed in a binder.

The optical disc accommodation recess member 5 is inclined slightly such that the depth from the uppermost surface of the sheet 2 is reduced as one goes in the direction of removing the accommodated disc 3 so that the disc 3 can be smoothly removed with a leading edge portion thereof raised from the surface of the sheet 2.

Adjacent to the optical disc accommodation recess member 5 is an elongate groove 10 formed such that it extends from a position under the center hole 3a of a stored optical disc 3 to a position beyond an edge of the optical disc 3 on the upper side. With the provision of the groove 10, a user's fingers can be readily applied to the center hole 3a and outer edge of the disc 3. In addition, when removing the disc 3, the tip of a finger holding the disc can be readily moved without rubbing the sheet 2.

Opposite side portions of the inner peripheral wall 4 of the optical disc accommodation recess member 5 are formed with inclined extensions 11 having stopper walls 11a gradually increasing in height from the bottom surface of the optical disc accommodation recess member 5. The stopper walls 11a are contacted by upper side arcuate portions of a stored optical disc 3 for providing a stopper function to prevent inadvertent detachment of the disc.

Further, when inserting and removing an optical disc, opposite side edges of the optical disc are in contact with the inclined extensions 11. Thus, the optical disc can be moved smoothly and handled safely without the possibility of causing damage to the record portion.

The optical disc retaining pieces 6 to 8 suitably project to such an extent that they support non-record portions and do not touch the record portion of the accommodated optical disc 3. These retaining pieces 6 to 8 are formed with inclined guides 6a to 8a such that the height thereof from the bottom surface of the optical disc accommodation recess member 5 increases in the removal or upward direction. The warping or inclination of the guides 6a to 8a conforms to the inclination of the optical disc upon insertion or removal of the disc. Thus, the optical disc 3 can be inserted and removed quickly and smoothly without contacting the disc record portion with the optical disc retaining pieces 6 to 8.

The outer edge of the sheet 2 has a large thickness for the purpose of reinforcement to prevent flexing of the optical disc accommodation device 1. It is possible to provide the sheet 2 with suitable ribs (not shown) for reinforcement of the optical disc accommodation device 1.

To insert the optical disc 3 in the optical disc accommodation device, the disc 3 is held by applying fingers to the center hole 3a and outer edge face of the disc 3. Then the trailing edge of the disc 3 is slightly inclined to allow the leading edge to slide over the surface of the optical disc accommodation recess member 5 by moving the finger applied to the disc 3 along the groove 10. Since the optical disc accommodation recess member 5 is gradually inclined downward in the insertion direction, the disc 3 enters the device smoothly. Eventually, the underside of opposite side portions of the disc 3 are brought into contact with the top surface of the inclined extensions 11, and subsequently the opposite side portions of the disc 3 are guided by the guides 6a and 7a of the optical disc retaining pieces 6 and 7 so that the disc 3 enters the space defined by the optical disc accommodation recess 5 and optical disc retaining pieces 6 and 7. Then, the leading edge of the disc 3 is guided by the guide 8a of the optical disc retaining piece 8 to enter the space defined by the optical disc accommodation recess member 5 and the optical disc retaining piece 8, while at the same time the disc 3, located on the inclined extensions 11, falls into the optical disc accommodation recess 5 to engage with the stopper walls 11a. In this way, the optical disc 3 is reliably accommodated in the optical disc accommodation recess member 5.

Once the optical disc 3 is accommodated in the optical disc accommodation device 1, inadvertent removal of the disc is prevented by the stopper walls 11a, and also detachment in a direction perpendicular to the surface of sheet 2 is reliably prevented by the optical disc retaining pieces 6 to 8. Thus, there is no possibility for the optical disc 3 to be inadvertently moved in or detached from the optical disc accommodation recess member 5.

To remove the optical disc 3, the disc 3 is held by applying fingers to the outer edge of the upper side and the center hole 3a, then the upper side or leading edge is raised until the height of its opposite side edges exceeds the height of the inclined extensions 11, and then the disc 3 is moved in the removal direction. As a result, the outer periphery of the optical disc 3 is separated from the stopper walls 11a and the opposite side edges of the optical disc 3 ride on the inclined extensions 11. Thus, the optical disc 3 can be taken out readily and smoothly in an inclined state and without the possibility of rubbing the disc record portion.

Figure 3:
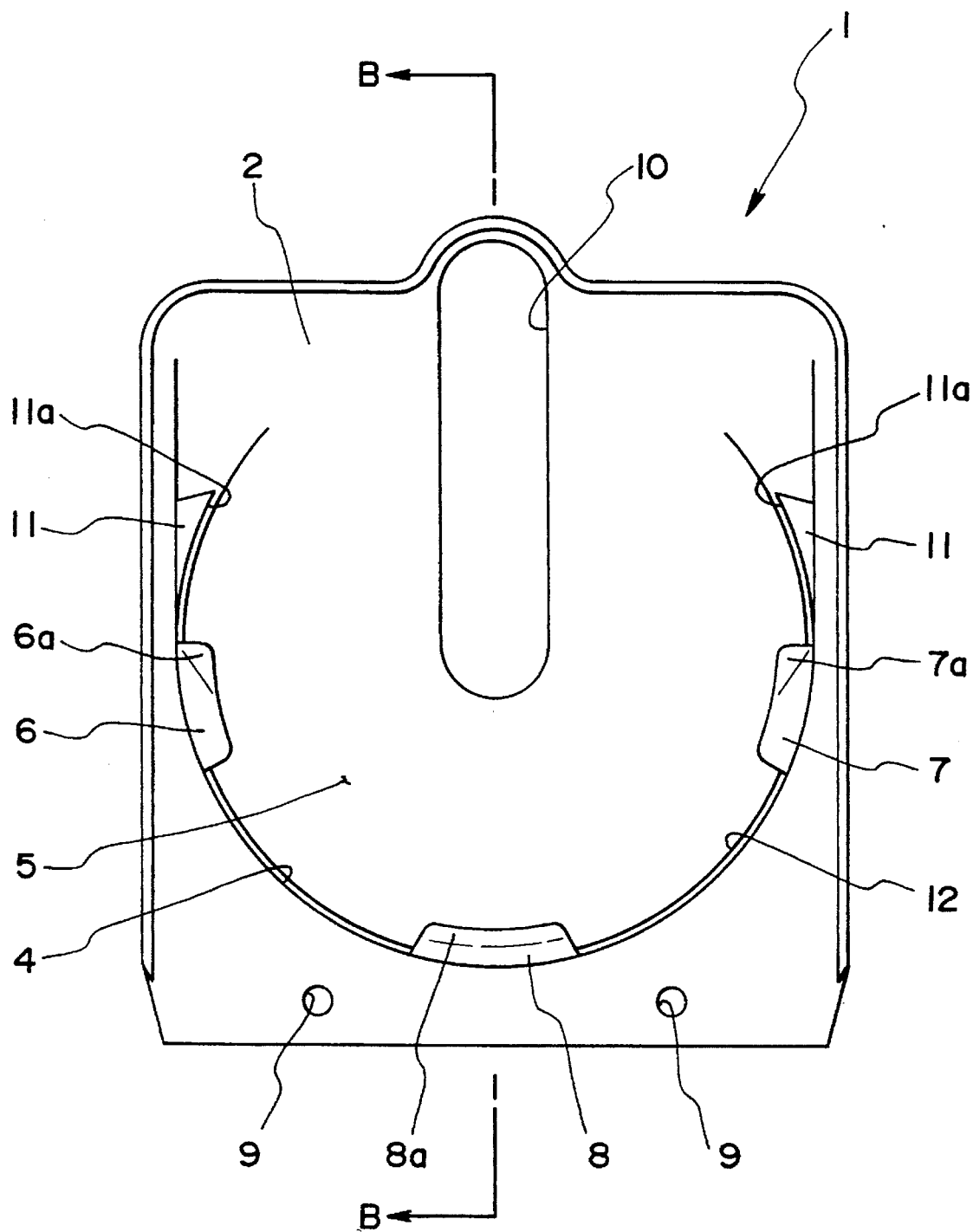
FIG. 3 is a plan view showing a second embodiment of the optical disc accommodation device according to the invention.
Figure 4:
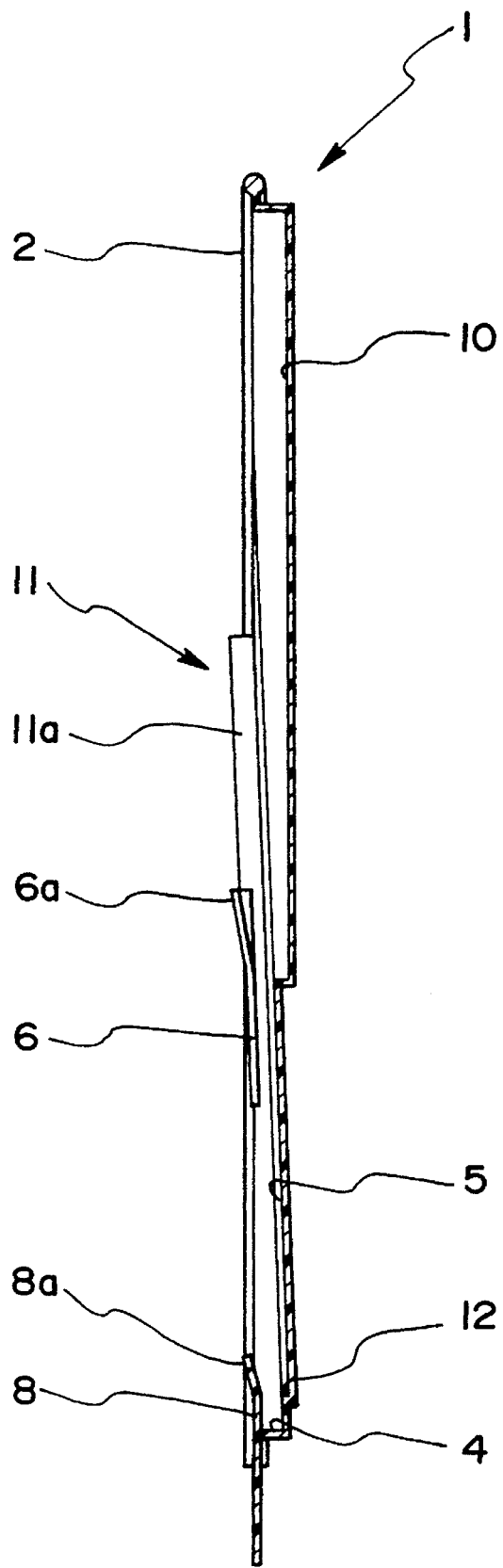
FIG. 4 is an enlarged-scale sectional view taken along line B—B in FIG. 3.

FIGS. 3 and 4 show a second embodiment of the optical disc accommodation device according to the invention. In this optical disc accommodation device 1, the outer periphery of the optical disc accommodation recess member 5 is provided with a step 12, which is adapted to be in contact with an outer peripheral portion, i.e. a non-record portion, of an accommodated optical disc 3 and raise the record portion thereof from the bottom of the optical disc accommodation recess member 5. With the step 12, the optical disc 3 can be accommodated without contacting the record portion with the device, and thus there is no possibility of damage to the record portion of the accommodated optical disc 3.

In the above two embodiments, the optical disc accommodation device 1 can be integrally formed by using a molding die.

FIG. 5 shows a third embodiment of the optical disc accommodation device according to the invention. In this optical disc accommodation device, a flexible bag 14 has one side secured to the optical disc accommodation device 1 in either of the above first and second embodiments such that it can be turned for opening. The bag 14 serves to accommodate material 15 such as a liner, a liner note, etc. in a musical compact disc, a specification in a computer compact disc, etc. It is made from a transparent synthetic resin sheet to permit the material 15 to be visually recognized from the surface side. This bag 14 covers the accommodated optical disc 3 to prevent dust from attaching thereto. The bag 14 may be clamped at the lower end of the sheet 2, or it may be bonded to the left or right side of the sheet 2 such that it can be turned for opening.

Figure 6:
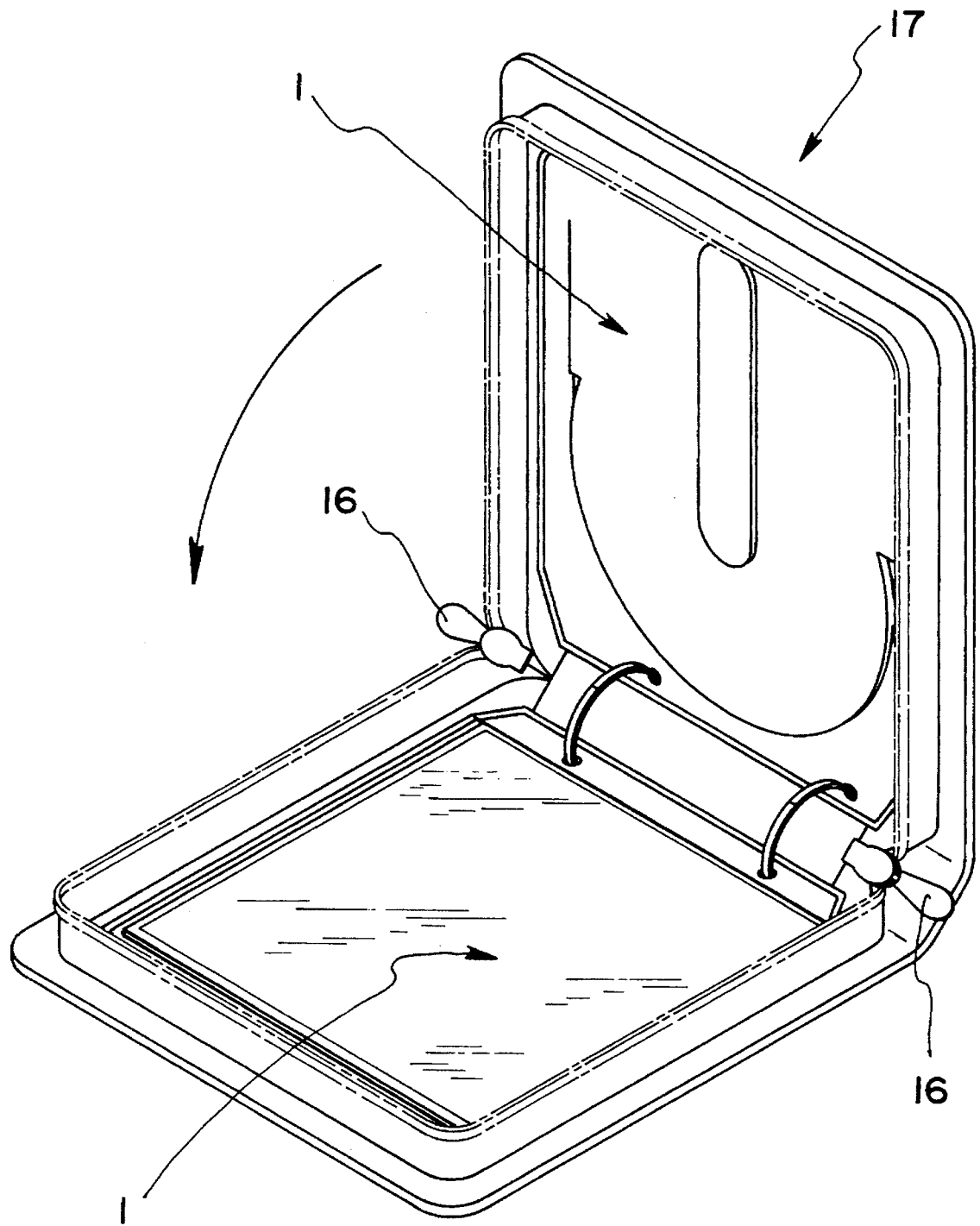
FIG. 6 is a perspective view showing the optical disc accommodation device according to the invention in one state of use.
Figure 7:
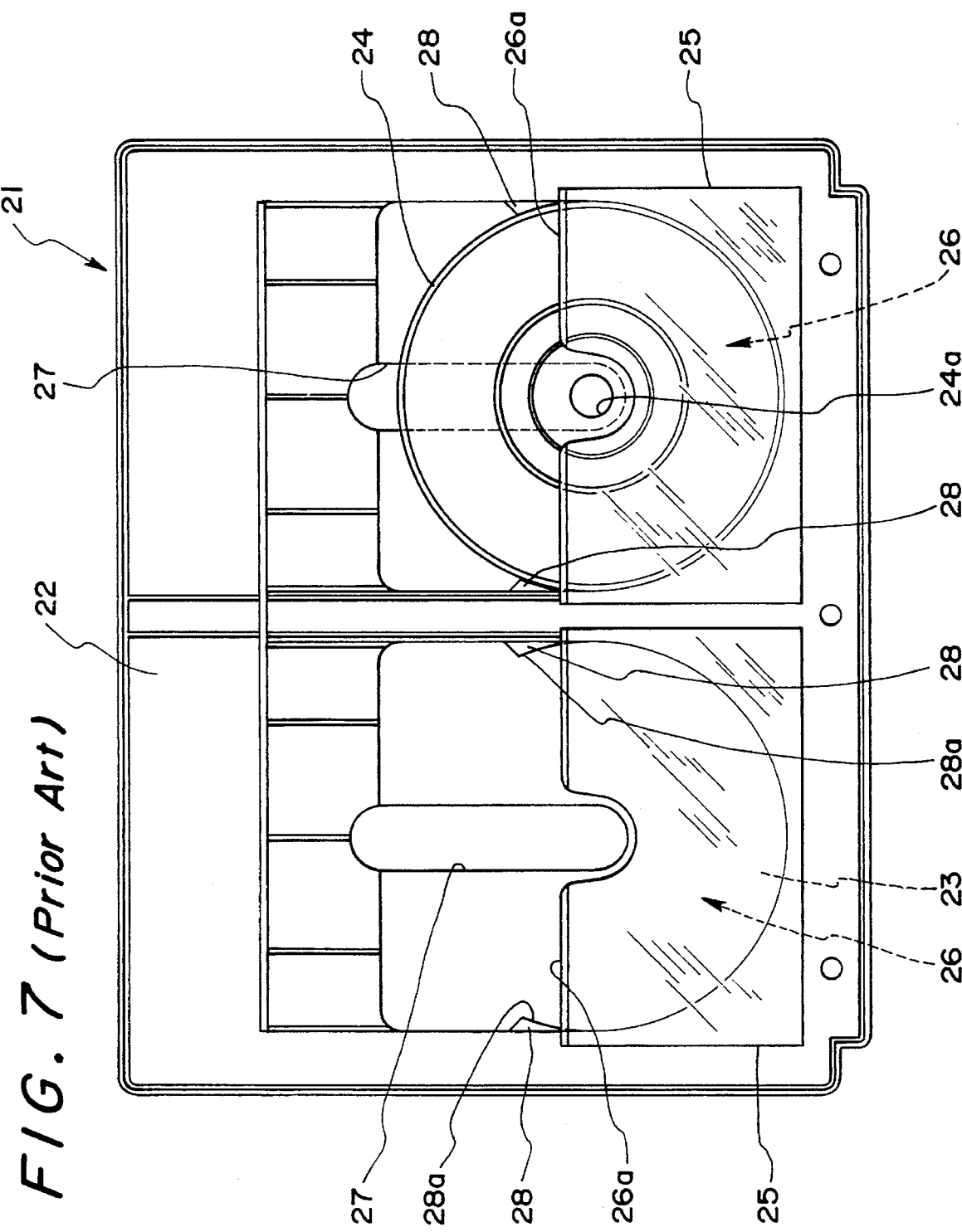
FIG. 7 is a plan view showing a prior art optical disc accommodation device.

FIG. 6 shows a state of use of the optical disc accommodation device according to the invention. As shown, a plurality of optical disc accommodation devices 1 are filed in binder 17, which can be opened and closed, by using a fastener 16. By utilizing such a binder 17, it is possible not only to permit ready replacement of optical discs but also to permit a plurality of optical discs to be carried or stored in a car without causing damage to the discs.

As has been described in the foregoing, with the optical disc accommodation device according to the invention, unlike the prior art disc accommodation device, there is no need to form an opening by flexing a soft synthetic resin sheet when inserting and removing an optical disc. In addition, optical discs are accommodated neatly, and there is no possibility of breakage of the accommodation section that might otherwise occur due to excessive force being applied to the optical disc when inserting or removing the disc. Further, it is possible to arrange and accommodate optical discs neatly and in a stable state without the important record portion of the discs being touched and possibly damage by the soft sheet.

Further, the optical disc accommodation device according to the invention may be integrally formed by using a molding die. This means that the optical disc retaining pieces may be formed as integral parts with the synthetic resin sheet. Thus, there is no need of an additional step of bonding a soft synthetic resin sheet to provide a bag part. This greatly contributes to a reduction in the cost of manufacturing the optical disc accommodation device.

Further, the inclined extensions of the optical disc retaining pieces guide the optical disc so that the disc is in an inclined state allowing smooth insertion or removal of the disc. Thus, when inserting or removing an optical disc, there is no possibility of contact of the record portion of the optical disc with the optical disc retaining pieces, and it is possible to insert or remove the optical disc more smoothly and quickly.

Further, when a plurality of optical disc accommodation devices according to the invention are used in a binder, not only is it possible to arrange and accommodate optical discs neatly and without taking up unnecessary space, but it is also possible to readily take out desired optical discs among many.

Further, where a flexible bag is secured to one side of the sheet so as to cover the top surface of the optical disc accommodation recess member and be turned for opening, materials accompanying optical discs can be arranged and accommodated simultaneously along with the associated optical discs, as well as covering the accommodated optical disc to prevent dust from being attached thereto.

What is claimed is:

1. An optical disc storage device comprising:
    a substantially planar member having an upper insertion portion and a lower portion;
    a disc storage recess formed in an upper surface of said substantially planar member, said recess being defined by an upstanding wall configured to contact over half of a peripheral edge of a stored optical disc and a bottom wall which is inclined so that the depth of said recess is reduced in a direction from said lower portion to said upper insertion portion of said substantially planar member;
    at least one stopper positioned adjacent said upstanding wall and having a disc abutment surface; and
    a rigid support structure for preventing inadvertent movement of a stored disc away from said inclined surface of said recess, said support structure being attached to a peripheral edge of said upstanding wall and extending inwardly therefrom toward a central portion of said recess so as to overlay a portion of said recess and define a space for receiving an edge of a stored optical disc, said support structure and said at least one stopper being configured to facilitate insertion and removal of an optical disc from said device.

2. The optical disc storage device as claimed in claim 1, further comprising a step portion provided on said upstanding wall.

3. The optical disc storage device as claimed in claim 1, wherein said support structure includes a first wall portion extending substantially perpendicularly from said upstanding wall and a second wall portion extending from and inclined relative to said first wall portion, said second wall portion forming a surface for guiding an optical disc into a stored position.

4. The optical disc storage device as claimed in claim 3, wherein said support structure is a plurality of discrete projections spaced along said upstanding wall for securing opposite side edge portions and a bottom edge portion of a stored optical disc.

5. The optical disc storage device as claimed in claim 1, further comprising:
    a flexible bag secured to a peripheral edge of said planar member, said flexible bag being pivotable from said planar member at said secured edge to expose said recess.

6. The optical disc storage device as claimed in claim 1, further comprising a plurality of binder engagement holes in said substantially planar member.

7. An optical disc storage device comprising:
    a substantially planar member having an upper insertion portion and a lower portion;
    a disc storage recess formed in an upper surface of said substantially planar member, wherein said disc storage recess is defined by a peripheral penannular upstanding wall and a bottom wall which is inclined toward said upper insertion portion of said substantially planar member, wherein the height of said upstanding wall diminishes as it extends toward said upper insertion portion;
    a plurality of rigid support projections attached to said upstanding wall and extending inwardly therefrom toward a central portion of said recess so as to overlay a portion of said recess and define a space for receiving a stored optical disc,
    wherein each said support projection includes a first wall portion extending substantially perpendicularly from said upstanding wall and a second wall portion extending from and inclined relative to said first wall portion for guiding an optical disc into said recess, and
    wherein said projections are spaced along said upstanding wall for preventing movement of a stored optical disc away from said bottom wall of said recess edge portions and a bottom edge portion of a stored optical;
    at least one stopper positioned adjacent said upstanding wall and having a disc abutment surface; and
    a plurality of binder engagement holes in said substantially planar member.

\* \* \* \* \*